Figure 1:
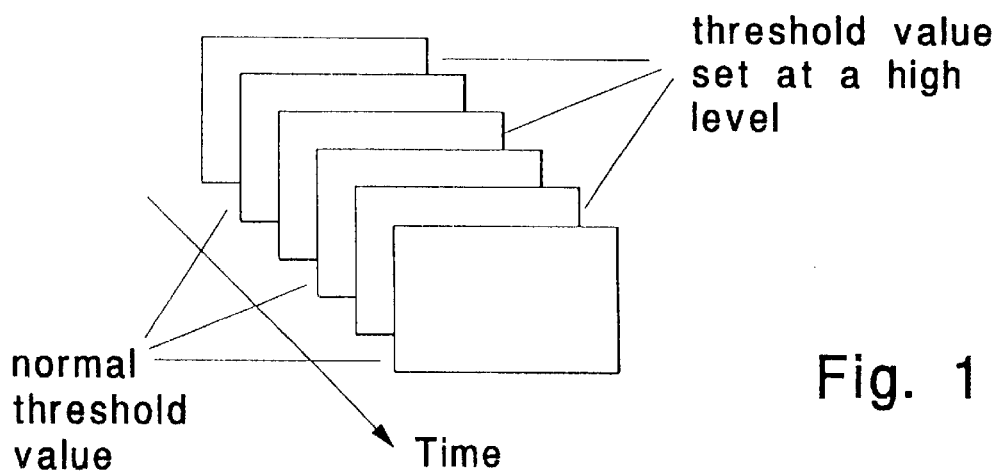

United States Patent

Mayer

[11] Patent Number: 5,870,498
[45] Date of Patent: Feb. 9, 1999

[54] METHOD OF PROCESSING IMAGE DATA FOR TRANSMISSION, AND USE OF THIS PROCESS

[75] Inventor: Jörg Mayer, Stuttgart, Germany

[73] Assignee: Ant Nachrichtentechnik GmbH, Backnang, Germany

[21] Appl. No.: 917,108

[22] Filed: Aug. 9, 1993

[30] Foreign Application Priority Data

Apr. 30, 1990 [DE] Germany .......................... 40 13 842.9

[51] Int. Cl.⁶ .................................................... G06K 9/36
[52] U.S. Cl. ............................................................ 382/232
[58] Field of Search ..................... 382/232, 236, 382/238, 240, 248, 250; 348/384, 394–395, 400–404, 407–416, 420–421, 425–430, 431, 699

[56] References Cited

U.S. PATENT DOCUMENTS

| | | | |
|---|---|---|---|
| 4,575,756 | 3/1986 | Furvkawa | 358/136 |
| 4,609,941 | 9/1986 | Carr et al. | 358/136 |
| 4,667,233 | 5/1987 | Furukawa | 358/136 |
| 4,698,689 | 10/1987 | Tzou | 382/56 |
| 4,751,742 | 6/1988 | Meeker | 382/56 |
| 4,805,017 | 2/1989 | Kaneko et al. | 358/105 |
| 4,837,618 | 6/1989 | Hatori et al. | 358/135 |
| 4,958,226 | 9/1990 | Haskell et al. | 358/136 |
| 5,117,287 | 5/1992 | Koike et al. | 382/56 |

FOREIGN PATENT DOCUMENTS

| | | | |
|---|---|---|---|
| 0236519 | 7/1989 | European Pat. Off. | 355/135 |
| 0279053 | 10/1991 | European Pat. Off. | 358/136 |

OTHER PUBLICATIONS

"Temporal Subsampling Methods in TV Signal Interframe Coding", by Mukawa et al; Review of the Electrical Communication Laboratories, vol. 32, No. 3, 1984.

*Primary Examiner*—Jose L. Couso
*Attorney, Agent, or Firm*—Loeb & Loeb LLP

[57] ABSTRACT

Image data representing successive original images is prepared for transmission by comparing the characteristics of an image data portion associated with each image region of each original image with the characteristic of the image data portion of the same image region of the immediately preceding original image to produce an indication of any difference between the image portions with respect to the characteristic, each differences indication is compared with a threshold value representing a selected difference indication, and, based on each difference indication which exceeds the threshold value, an operation is performed, which involves preparing transformation-coded data or determining a motion vector. The Threshold value from one original image to the next is changed so that the threshold value has a low value for a first group of original images and a high value for a second group of original images, where the original images of the first group alternate with the original images of the second group. The high value is selected so that for each original image of the second group, the performance of an operation based on each difference indication will be carried our for only a small number of image regions in which major changes occur relative to the preceding original image.

10 Claims, 1 Drawing Sheet

METHOD OF PROCESSING IMAGE DATA FOR TRANSMISSION, AND USE OF THIS PROCESS

The invention is directed to a process for preparing image data for transmission purposes, wherein the image data of an original image are broken down into image zones, and transformation-coded data are prepared and/or a motion vector is determined per image zone as a function of a change criterion, for example of a threshold value that serves to distinguish between changed and unchanged image zones.

When image data are prepared for transmission over a transmission channel with limited transmission capacity, it is known to leave out original images present on the transmission end and to interpolate the left-out original images on the reception end from two adjacent transmitted original images. However, this leads to the multiple representation of moving image zones, with jerky reproduction.

In European Patent Application EP 236 519 A1, to avoid this disadvantage, a motion vector is determined for each pixel of a left-out original image and is used for a motion-compensated interpolation.

From German Patent 37 04 777, it is known to prepare transformation-coded data for image zones that have a high proportion of motion and to write motion vectors for image zones with a lower proportion of motion. A threshold value is used as a criterion to distinguish image zones that are little changed and those that are greatly changed.

The object of the invention is to provide a process of the type indicated above which prevents the structural pattern caused by a transformation coding from being perceived as being interfering, particularly in those cases where motion compensation is inadequate because of limited resolution. Use of this process is also to be disclosed.

With respect to the process, this object is attained by setting the threshold value for an original image following a preceding original image so high that transformation-coded data are prepared and/or a motion vector is determined only for a few image zones, in which major changes occur compared with the corresponding image zone of the original image, and with respect to the use, it is attained by performing the above-described process for original image sequences with little motion from one original image to the next, in particular original image sequences taken without a tripod process for reconstructing image data prepared by the above-described process may include performing, for those images in which the threshold was set high, an interpolation of at least two adjacent images, for which because, of their low threshold values, transformation-coded data were prepared and/or many motion vectors were determined for many image zones, and inserting those image zones for which transformation-coded data were prepared and/or a motion vector was determined for reconstruction of the corresponding image zone into this thus-obtained interpolated image.

The invention is based on the following knowledge: It is generally conventional to transmit only those image zones in which changes have been determined. This determination is made by a segmenter, which can be adapted to the camera noise, so that fewer wrong decisions will be made. Motion compensation is also done. In typical video conference situations, up to 50% of the image content is unchanged when a camera tripod is used.

This situation changes if the camera is hand-held. Then—because of small motions of less than one pixel—there is no longer any static image content. Each image zone (image block) must be transmitted, in order to guarantee the coherence of the image—that is, a homogeneous subjective image impression. Because the resolution is by definition limited to one pixel, no improvement can be gained from motion compensation. The consequence is a relatively coarse transformation coding (such as DCT, for discrete cosine transform) quantization threshold, which allows block artifacts to become visible. In the invention, the segmenter threshold value is switched over from one original image to the next. For example, it is agreed that the threshold value is at its normal value for even-numbered images. As a result, almost every block (image zone) is transmitted without using a tripod. Then for the odd-numbered images, the threshold is set to a very high value, so that only image zones with major changes are detected. Additionally, the value of the displacement vector can also be considered a measure for a change. The number of blocks transmitted in odd-numbered images is reduced as a result. Consequently, the DCT quantization threshold can be lowered while the channel capacity remains the same, and the image quality becomes better. The process according to the invention can be employed by retrofitting a conventional video coder, by modifying the course of control.

For all types of motion, for instance numerous small motions as well as few major motions, the process of the invention leads to good reconstruction without block structures or jerky motions.

Figure 2:
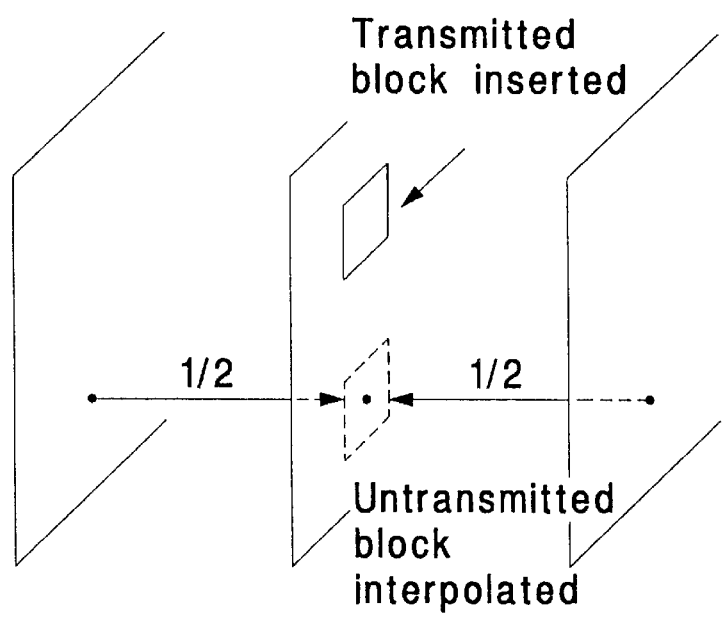

An exemplary embodiment of the invention will now be described in detail, referring to the drawings. Shown are:

FIG. 1, an original image sequence with a switchover of the segmenter threshold values;

FIG. 2, the reconstruction of left-out original images; and

Figure 3:
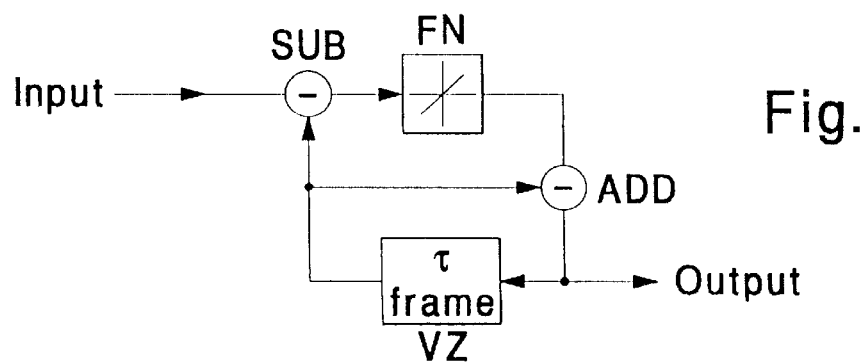

FIG. 3, a block circuit diagram of a recursive filter for noise suppression.

As shown in FIG. 1, the segment threshold value, that is, the threshold value by which a decision is made as to whether an image zone, for instance a rectangular block, has or has not undergone some change, is switched over for every other original image. The determination of segmenter threshold values can be done for instance by evaluating differences from one image to the next (frame difference FD); for instance, see U.S. Pat. No. 4,771,331 or the dissertation entitled "Codierung von Fernsehsignalen für niedgrige Übertragungsbitraten" [Coding TV Signals for Low Transmission Bit Rates] by J. Klie, TU Hannover [Technical University, Hanover], 1978, pp. 62–69. Instead of a threshold value, some other criterion that enables distinguishing between changed and unchanged image zones may be used. For instance, it is agreed that the threshold value for even-numbered images is at its normal-low-value, which is selected such that the integrity of a moving object is maintained. Thus, without using a tripod, almost every block is transmitted. Double edges when a course of motion are observed accordingly do not occur. The threshold value for the odd-numbered images is then set to a very high value, so that only image zones with major changes are detected. If motion is detected from the exceeding of the low normal threshold value or of the high threshold value set for the odd-numbered images, then for the effected image zone, in a known manner, transformation-coded data are prepared and/or a motion vector is determined (see German Patent 37 04 777, for example). The transformation-coded data and the motion vectors, optionally after quantization and a known VWL coding, are transmitted over the transmission channel with a limited bandwidth, for instance a 384 kbit/s channel. Since only a very few image zones of odd-numbered original images have to be transmitted, the quantization threshold can be lowered in comparison with the usual signal preparation while the channel capacity available is the same, and the image quality can be improved thereby—that is, coarse block structures do not occur. In a conventional video coder, the process of the invention can be provided by retrofitting, by modification of the course of control.

In the decoder, the odd-numbered images, only some of which have been transmitted, are reconstructed by linear interpolation, for instance from adjacent images (see FIG. 2). The transmitted image zones (blocks)—DCT coefficients and/or motion vectors—are inserted into this reconstruction. By adding a temporally non-linear recursive filter to the output side, noise is reduced also. An example of such a filter is shown in FIG. 3. The input signal—the reconstructed odd-numbered image—is delivered via a subtractor SUB to a function network FN. This functional network has a transmission function that suppresses small amplitude changes but leaves major amplitude changes undistorted. The filtered signal can be picked at the output of the function network FN. The filtered signal is delivered to a delay member VZ, which exhibits a delay that corresponds to the time interval between two succeeding original images (frames). The delayed signal is delivered to the subtractor SUB and added to the output signal via an adder ADD. The filter can also be designed as a "compromise filter" with respect to its characteristic curve; the compromise is made between the allowable looping of low-contrast moving edges and the tolerable image noise. The characteristic curve (of the function network) shown in FIG. 3 should be considered purely exemplary. It can be adapted as needed to the desired properties of the filter.

In the decoder, the process leads to an additional delay of the duration of one frame. The requisite image memory is available in any case when a decoder is used for high-resolution still pictures, so there is no additional expense.

Besides the threshold value, the quantity of the motion vector can also be used as a standard for the decision as to whether transformation-coded data are prepared for an image zone.

For defining the threshold value set at a high level, the total image activity to be expected should also be considered. It is especially advantageous to define this high threshold value as a function of the total bit rate to be transmitted. Experiments have shown that the threshold value is favorable if approximately 5 to 15% of the total bit rate to be transmitted is assigned to those image zones in which the threshold value is exceeded.

Naturally it is also possible for this threshold value to be gradually set at a high level and decreased again, in a manner distributed over a plurality of original images. This can be done as a function of an image activity function, for instance as provided in German Patent 37 04 777.

The process of the invention is compatible with the video codec in accordance with CCITT Draft Revision of Recommendation H. 261.

I claim:

1. In a process for preparing image data in the form of image data signals for transmission, wherein the image data represents successive original images, each original image is divided into a plurality of image regions, each image region is associated with a respective portion of the image data and each image data portion has a characteristic, the process including comparing the characteristic of the image data portion associated with each image region of each original image with the characteristic of the image data portion of the same image region of the immediately preceding original image to produce an indication of any difference between the image data portions with respect to the characteristic, comparing each difference indication with a threshold value representing a selected difference indication, and, based on each difference indication which exceeds the threshold values, performing at least one operation selected from the group consisting of preparing transformation-coded data and determining a motion vector, the improvement comprising changing the threshold value from one original image to the next so that the threshold value has a low value for a first group of original images and a high value for a second group of original images, where the original images of the first group alternate with the original images of the second group, the high value being selected so that for each original image of the second group, said performing step based on each difference indication will be carried out for only a small number of image regions in which major changes occur relative to the preceding original image.

2. The process of claim 1 wherein said steps of comparing, performing and changing are applied to chronologically succeeding original images.

3. A process for preparing image data for transmission, transmitting the prepared image data and reconstructing the transmitted image data, comprising:

preparing image data in the form of image data signals for transmission, wherein the image data represents successive original images, each original image is divided into a plurality of image regions, each image region is associated with a respective portion of the image data and each image data portion has a characteristic, the process including comparing the characteristic of the image data portion associated with each image region of each original image with the characteristic of the image data portion of the same image region of the immediately preceding original image to produce an indication of any difference between the image data portions with respect to the characteristic, comparing each difference indication with a threshold value representing a selected difference indication, and, based on each difference indication which exceeds the threshold value, performing at least one operation selected from the group consisting of preparing transformation-coded data and determining a motion vector, the improvement comprising changing the threshold value from one original image to the next so that the threshold value has a low value for a first group of original images and a high value for a second group of original images, where the original images of the first group alternate with the original images of the second group, the high value being selected so that for each original image of the second group, said performing step based on each difference indication will be carried out for only a small number of image regions in which major changes occur relative to the preceding original image, wherein said steps of comparing, performing and changing are applied to chronologically succeeding original images wherein the image data prepared for transmission contains signals based on the difference indications as produced in said comparing step; and reconstructing the image data after transmission by performing the steps of:
producing reconstructed image data from the signals;
forming a respective reconstructed image corresponding to each original image of the first group from the reconstructed image data; and
forming a respective reconstructed image corresponding to each original image of the second group by effecting linear interpolation between two adjacent reconstructed images of the first group for those image regions for which said performing step was not carried out for the corresponding original image of the second group, and inserting reconstructed image data produced from the signals for each image region for which said performing step was carried out for the corresponding original image of the second group.

4. The process of claim 3 wherein, in said process for preparing image data for transmission, said step of performing at least one operation comprises determining a motion vector having a magnitude for each image region for which the difference indication exceeds the threshold value, and generating transformation-coded data for each image region for which the magnitude of the motion vector exceeds a given value and the difference indication exceeds the threshold value.

5. The process of claim 3 wherein said step of performing comprises preparing transformation-coded data, the successive original images represent a scene having a moving object, the low threshold value is selected to provide an accurate representation of the moving object in the reconstructed images, and the high threshold value is selected such that block structures containing transformation-coded data are effectively suppressed in the reconstructed images corresponding to the original images in the second group.

6. The process of claim 3 wherein said process for reconstructing further comprises effecting temporally non-linear filtering of data in the reconstructed images in order to suppress small changes from one reconstructed image to the next.

7. The process of claim 1 wherein the image data is in the form of digital data composed of a succession of bits, the image data is to be transmitted at a given bit rate, and the high threshold value is selected on the basis of the given bit rate.

8. The process of claim 7 wherein the high threshold value is selected such that 5 to 15% of the bits to be transmitted are assigned to image regions of the second group of original images.

9. The process of claim 1 wherein the successive original images represent a scene producing a low level of motion from one original image to the next.

10. The process of claim 1 wherein the image data is produced by a nonstationary camera.

* * * * *